March 31, 1970   P. WILTON   3,503,759
BAG FOR TRIANGULAR CUT SANDWICH AND THE LIKE
Filed Feb. 3, 1967   2 Sheets-Sheet 1
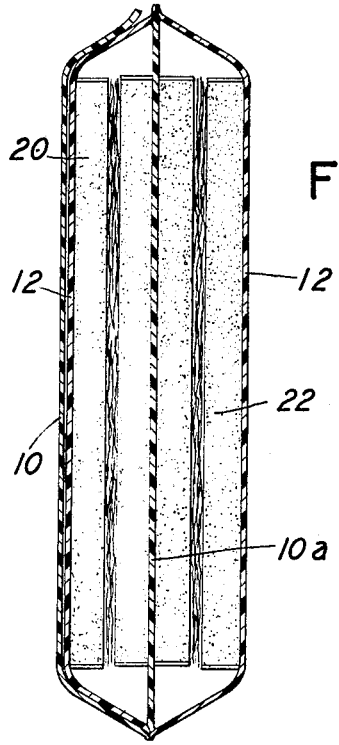
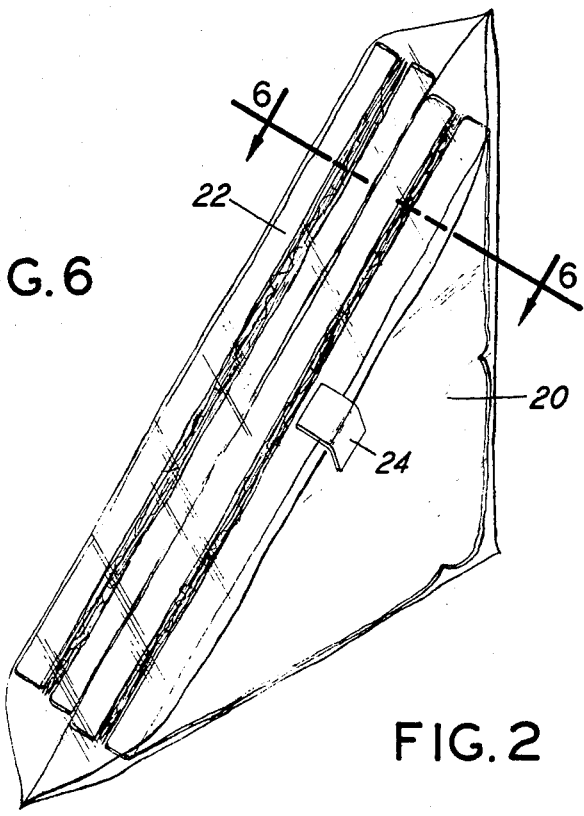
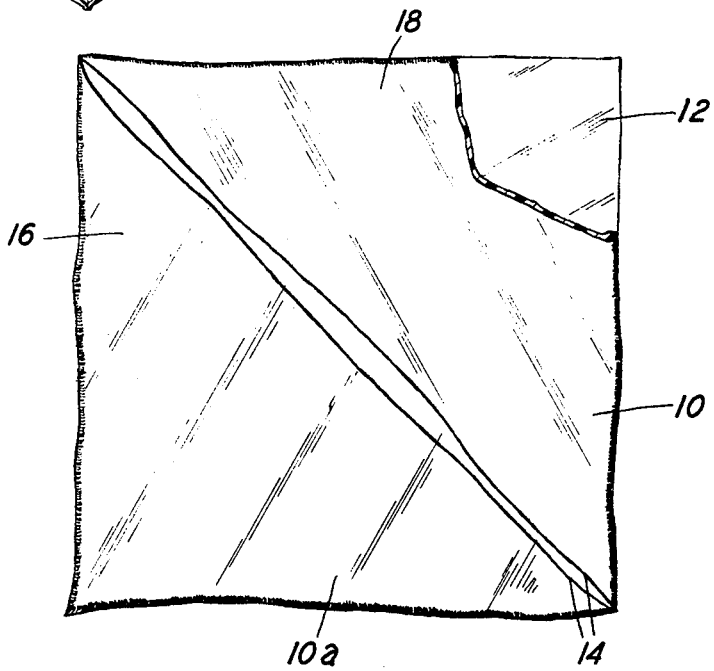
INVENTOR.
PETER WILTON
BY
ATTORNEY March 31, 1970        P. WILTON        3,503,759
BAG FOR TRIANGULAR CUT SANDWICH AND THE LIKE
Filed Feb. 3, 1967        2 Sheets-Sheet 2
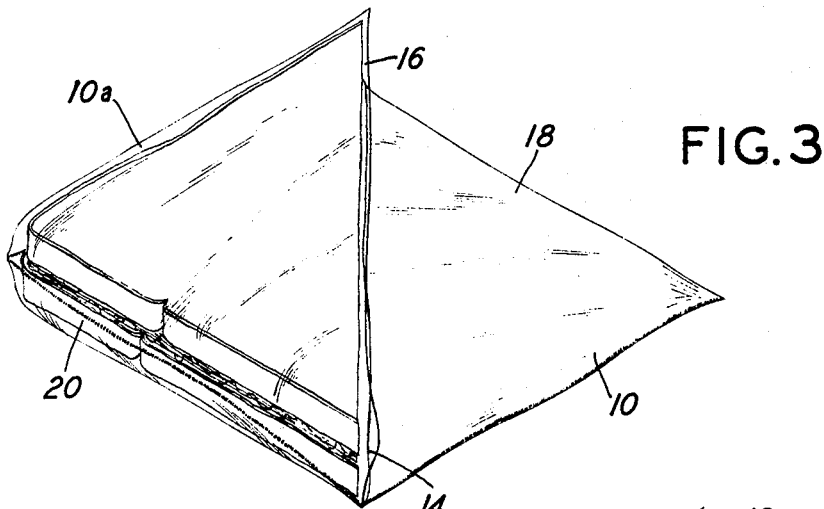
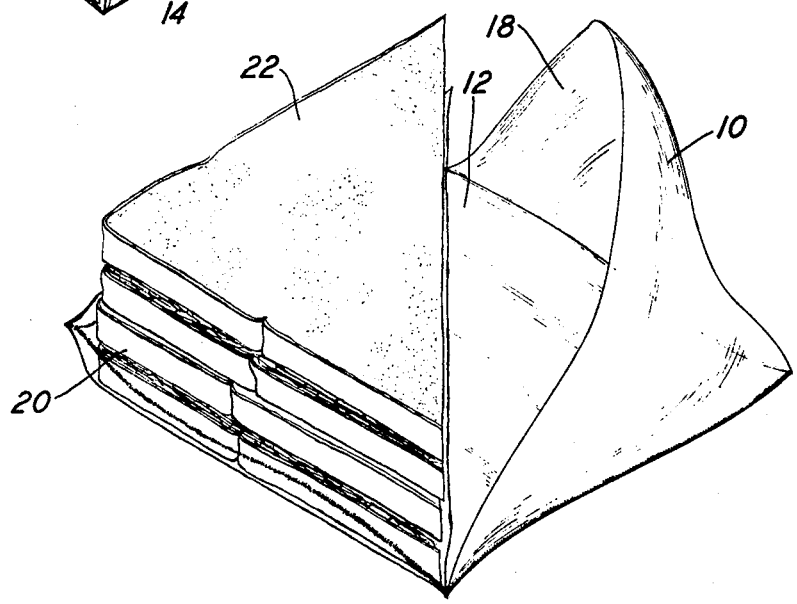
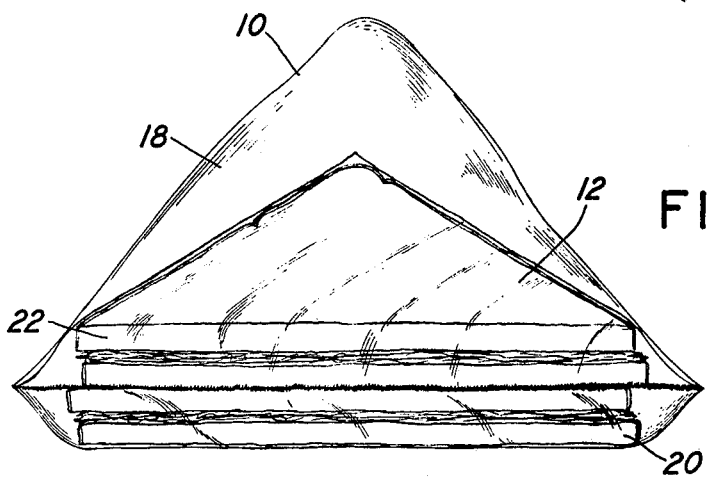
INVENTOR.
PETER WILTON
BY
ATTORNEY

United States Patent Office 3,503,759
Patented Mar. 31, 1970

3,503,759
BAG FOR TRIANGULAR CUT SANDWICH AND THE LIKE
Peter Wilton, Plainfield, N.J., assignor to Union Carbide Corporation, a corporation of New York
Filed Feb. 3, 1967, Ser. No. 613,950
Int. Cl. B65b 25/18
U.S. Cl. 99—173
4 Claims

ABSTRACT OF THE DISCLOSURE

A bag for triangular cut sandwiches composed of two flat square walls of thin flexible sheet material, the walls being joined at all outer edges and one wall having a slit extending diagonally between two corners to provide two open pockets. One half of sandwich is placed into one pocket, the other half is placed on top of first half of sandwich outside of pocket and the other pocket is folded over the entire sandwich to close the bag.

---

This invention relates to flat bags of thin flexible sheet material. More particularly, this invention relates to a flat bag for use in packaging a diagonally cut or "triangular" sandwich. Bags of this invention are preferably, although not necessarily, made of thin, transparent plastic film material.

Sandwich bags made from thin plastic film such as polyethylene film, are commercially available. They are designed for use in the home to package sandwiches which in most cases are prepared from packaged bread. The bread slices are usually nearly square or oval and the sandwiches are inserted into the bags as approximately square or oval shapes. Although the bread of the sandwich is visible through the plastic film, it is difficult to determine the filler unless it extends beyond the bread.

In self-service restaurants or other places where sandwiches are prepared in advance use, the sandwiches are usually cut diagonally and one half is superimposed on the other to form a roughly triangular stack, so that the contents are easily seen at the cut edges. Bags are rarely used. The preferred method of packaging is a waxed paper or plastic sheet wrap.

It is an object of this invention to provide a flat bag for packaging a diagonally cut or "triangular" sandwich or the like.

Another object of this invention is to provide a flat triangular sandwich bag made from a thin, transparent plastic film material which is capable of securing diagonally cut or "triangular" sandwich or the like.

Another object of this invention is to provide a flat triangular sandwich bag made from a thin, transparent plastic film material which is capable of securing diagonally cut halves of the sandwich in place while at the same time providing a view of the sandwich filler at the cut edge of the sandwich.

The bag of this invention consists of two flat approximately square overlying walls of a thin flexible sheet material, preferably a transparent thermoplastic resin film, joined at all outer edges, one wall having between two opposite diagonally located corners a slit forming the bag into two triangular pockets. In use, one-half sandwich is inserted through the slit into one pocket, the other half sandwich is placed outside the bag on top of the first half, the cut edges of the sandwich being generally aligned with the slit, the second pocket is then opened and both halves of the sandwich are put into the second pocket. Thus, there is a layer of sheet material between the two sandwich halves, the structure of the bag supports all parts of the sandwich, and no part of the sandwich is at the opening of the filled bag.

The invention will be more particularly described with reference to the accompanying drawings, in which:

FIG. 1 is a plan view of an empty bag showing a diagonal slit in one wall of the bag;
FIG. 2 is an isometric view of a filled bag, illustrating the visibility of the sandwich and its filler;
FIGS. 3, 4 and 5 are isometric views illustrating successive steps in packaging the sandwich within the bag; and
FIG. 6 is a sectional view taken along the line 6—6 in FIG. 2 showing the arrangement of the bag walls and sandwich at either leg of the triangle.

Referring to the drawings and particularly to FIG. 1, the bag of this invention consists of flat substantially square front and rear walls 10, 12 joined at all four sides, the front wall 10 having a slit 14 extending diagonally between two opposite corners to provide two pockets 16, 18 within the bag.

In use, one half 20 of a triangular cut sandwich is placed in one pocket as at 16 in FIG. 3. The second half 22 of the sandwich is then placed on the outer front wall (10a in FIG. 3) of the pocket 16 as shown in FIG. 4. In this arrangement, the cut ends of the two sandwich halves 20, 22 are aligned and outwardly faced as shown in FIG. 2. The other pocket 18 is opened and the rest of the package and contents are then inserted into the second pocket 18 as illustrated in FIGS. 4 and 5. An adhesive tape 24 may be used as an aid in maintaining the bag in a closed position if desired. The bag and packaged sandwich are shown in FIG. 2.

The bag of this invention may be made in any convenient way. A preferred method comprises feeding two strips of plastic film, which may be the same or different in color, texture, composition or imprint, so that they are superimposed, the top film diagonally cut, the side edges heat-sealed and the ends heat-sealed and either scored or cut depending on whether separate bags or a roll of attached separable bags is desired. If desired, the edges of the slit in the top wall 10 may be embossed, printed, or otherwise treated for readier identification.

What is claimed is:

1. A bag for triangular cut sandwiches comprising two flat substantially square walls of thin flexible sheet material, the walls being joined at all outer edges and only one wall having a slit extending diagonally between two corners to provide two open pockets.

2. The bag as defined in claim 1 wherein the flexible sheet material is a thin transparent thermoplastic resin film.

3. A method of packaging a diagonally cut sandwich which comprises forming a bag consisting of two flat substantially square walls joined at all outer edges with one wall having a slit extending diagonally between two corners to provide two open pockets, placing one half of the cut sandwich into one pocket with the cut edge aligned with said slit, placing the other half of the cut sandwich outside said pocket and on top of the first half sandwich with the two cut edges aligned, and folding the second pocket over the entire sandwich.

4. The method as defined in claim 3 wherein an adhesive tape is applied to a free end of the second pocket for maintaining the bag in a closed position.

References Cited

UNITED STATES PATENTS 2,709,467   5/1955   Hoeppner _____ 150—7
3,358,906   12/1967  Faiers _____ 229—62

A. LOUIS MONACELL, Primary Examiner
WARREN BOVEE, Assistant Examiner

U.S. Cl. X.R.

229—62

PO-1050
(5/69)

UNITED STATES PATENT OFFICE
CERTIFICATE OF CORRECTION

Patent No. 3,503,759            Dated March 31, 1970

Inventor(s) P. Wilton

It is certified that error appears in the above-identified patent and that said Letters Patent are hereby corrected as shown below:

Column 1, lines 48-51, the entire paragraph is deleted.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents